W. P. SEATON.
ANIMAL COVER.
APPLICATION FILED AUG. 31, 1918.
1,335,032.
Patented Mar. 30, 1920.
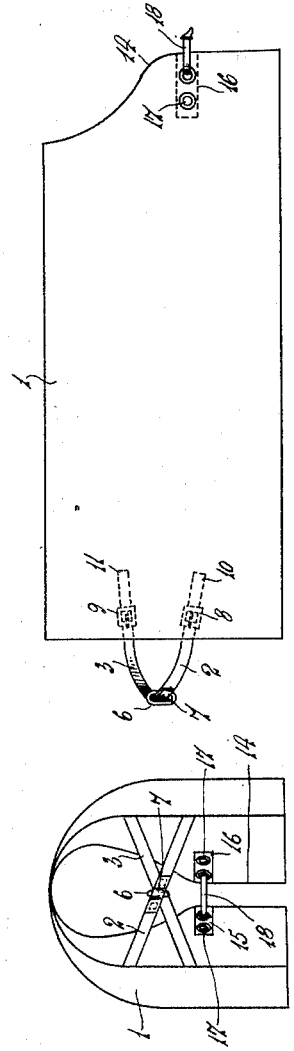
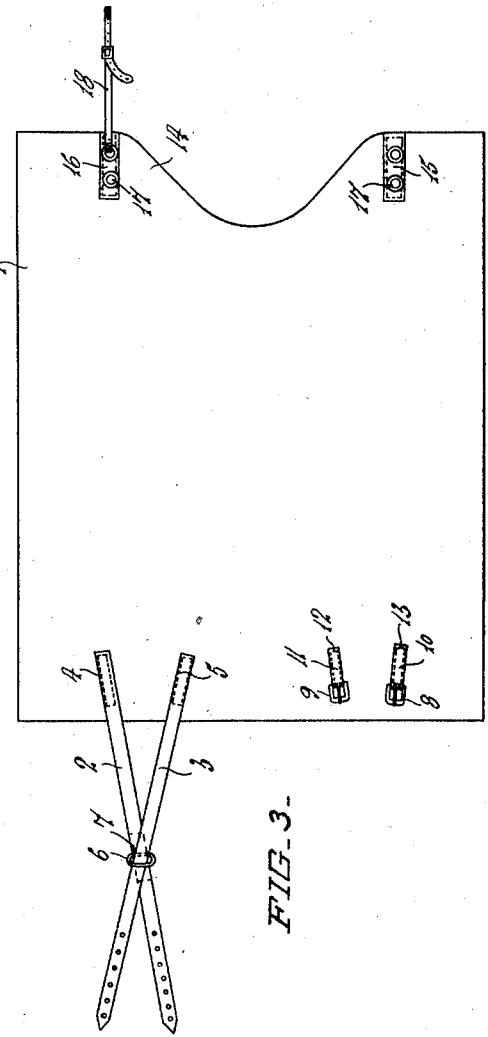
Inventor:
William Peter Seaton
per H. W. Plucker
Attorney.

UNITED STATES PATENT OFFICE.

WILLIAM PETER SEATON, OF HENDERSON, NEW ZEALAND.

ANIMAL-COVER.

1,335,032.  Specification of Letters Patent.  Patented Mar. 30, 1920.

Application filed August 31, 1918. Serial No. 252,174.

*To all whom it may concern:*

Be it known that I, WILLIAM PETER SEATON, a citizen of the Dominion of New Zealand, and residing at Te Atatu Road, Henderson, in the Provincial District of Auckland, in the Dominion of New Zealand, have invented certain new and useful Improvements in Animal-Covers, of which the following is a specification.

This invention relates to covers for protecting animals, and more particularly cows, from the weather, and provides a cover with fastenings, which while avoiding the chafing of the animal, keep the cover securely on the animal and at the same time allow perfect freedom of action when the animal lies down or moves about.

When a cover is fastened by straps passing around the hind legs of a cow, the udder and legs are liable to be chafed. My invention avoids this disadvantage.

According to this invention the rear of the cover is provided with two straps secured at one end to the cover, and fastened at the other end by buckles and straps. The straps and buckles are fixed at different heights to the cover, and the straps cross each other under the tail of the animal. One of the straps is provided with a metal ring through which the other strap passes, so that the straps are slidably connected together.

The breast of the cover is provided on each side with a plurality of holes arranged in a horizontal line, and a strap or loop passed through the holes secures the breast of the cover. The holes are eyeleted and permit of adjusting the breast of the cover on animals of different sizes.

The invention may be conveniently and advantageously carried into practice as shown in the accompanying drawing, wherein:—

Figure 1 is a side elevation,

Fig. 2 is a rear elevation, and

Fig. 3 is a plan of the cover opened out.

The invention will be described as used upon a cow.

The cover 1 is made of canvas or other usual material and of ordinary shape. The rear of the cover is provided with straps 2 and 3 attached at different heights by stitching 4 and 5 respectively to one side of the cover and on the inner side thereof. The strap 2 is provided at its middle part with a ring 6 attached by a loop 7.

The strap 3 crosses the strap 2 and passes through the ring 5.

The straps 2 and 3 are adapted to be fastened to the other side of the cover by buckles 8 and 9 respectively, secured at different heights to the inner side of the cover by loops 10 and 11 attached by stitching 12 and 13.

The straps 2 and 3 pass around the rear of the cow and beneath its tail, so that there are no straps passing around the legs of the cow.

The breast 14 of the cover is reinforced by leather strips 15 and 16, in which eyeleted holes 17 are provided. A strap or loop 18 is passed through such of the holes 17 as are required to draw the cover around the breast of the cow.

What I do claim and desire to secure by Letters Patent of the United States is:—

The combination with an animal cover of a line of eyeleted holes on each side of the cover at the front thereof, said holes being formed in the material of the cover and the latter being reinforced by leather strips, a strap adapted to be passed through any of said holes, straps attached at different heights to one side of the rear of the cover, buckles attached at different heights to the other side of the rear of the cover, the said straps crossing each other, and a ring attached to one of said straps through which the other strap slidably passes.

In testimony whereof I have signed my name to this specification in the presence of two witnesses.

WILLIAM PETER SEATON.

Witnesses:
D. A. McCONNELL,
D. RAPSON.